(12) United States Patent
Dellock et al.

(10) Patent No.: US 10,220,769 B1
(45) Date of Patent: Mar. 5, 2019

(54) VEHICULAR IMAGE PROJECTION

(71) Applicant: Ford Global Technologies, LLC, Dearborn, MI (US)

(72) Inventors: Paul Kenneth Dellock, Northville, MI (US); Stuart C. Salter, White Lake, MI (US); Venkatesh Krishnan, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/682,983

(22) Filed: Aug. 22, 2017

(51) Int. Cl.
*G08G 1/095* (2006.01)
*B60Q 1/50* (2006.01)

(52) U.S. Cl.
CPC .............. *B60Q 1/50* (2013.01); *G08G 1/095* (2013.01)

(58) Field of Classification Search
CPC .................................. B60Q 1/50; G08G 1/095
USPC .................................................... 340/907
See application file for complete search history.

(56) References Cited

U.S. PATENT DOCUMENTS

| | | | |
|---|---|---|---|
| 6,084,507 A * | 7/2000 | Butler | B60Q 1/32 340/437 |
| 9,771,021 B1 * | 9/2017 | Lindsay | B60Q 1/525 |
| 2006/0009188 A1 * | 1/2006 | Kubota | G08G 1/096725 455/344 |
| 2011/0098898 A1 * | 4/2011 | Stahlin | G08G 1/095 701/70 |
| 2012/0044090 A1 * | 2/2012 | Kahler | B60Q 1/50 340/905 |
| 2014/0247160 A1 * | 9/2014 | Glascock | G08G 1/095 340/907 |
| 2015/0012200 A1 * | 1/2015 | Joshi | G08G 1/0967 701/70 |
| 2015/0058127 A1 * | 2/2015 | Abuelsaad | G06Q 30/0266 705/14.63 |
| 2015/0154863 A1 * | 6/2015 | Fossier | G09F 9/33 340/907 |
| 2015/0379872 A1 * | 12/2015 | Al-Qaneei | G08G 1/096783 340/905 |
| 2017/0011628 A1 * | 1/2017 | Rios Cortes | B60Q 1/302 |
| 2017/0050558 A1 * | 2/2017 | Salter | B60R 1/12 |
| 2017/0256167 A1 * | 9/2017 | Kim | G08G 1/096783 |
| 2018/0004020 A1 * | 1/2018 | Kunii | B60Q 1/04 |
| 2018/0082587 A1 | 3/2018 | Wan et al. | |
| 2018/0297470 A1 | 10/2018 | Kim | |

FOREIGN PATENT DOCUMENTS

| | | |
|---|---|---|
| CN | 203472784 U | 3/2014 |
| DE | 102014011811 A1 | 2/2016 |
| KR | 20170001677 A | 1/2017 |
| MX | PA02009331 A | 3/2004 |
| WO | 2014181025 A1 | 11/2014 |

OTHER PUBLICATIONS

Non-Final Office Action dated Jan. 15, 2019 re U.S. Appl. No. 15/683,017.

* cited by examiner

*Primary Examiner* — Zhen Y Wu
(74) *Attorney, Agent, or Firm* — Frank A. MacKenzie; Bejin Bieneman PLC

(57) ABSTRACT

A computer is programmed to receive data indicating a state of a traffic signal. The computer is further programmed to activate a light source in a first vehicle to project a traffic signal symbol representing the state of the traffic signal.

20 Claims, 11 Drawing Sheets

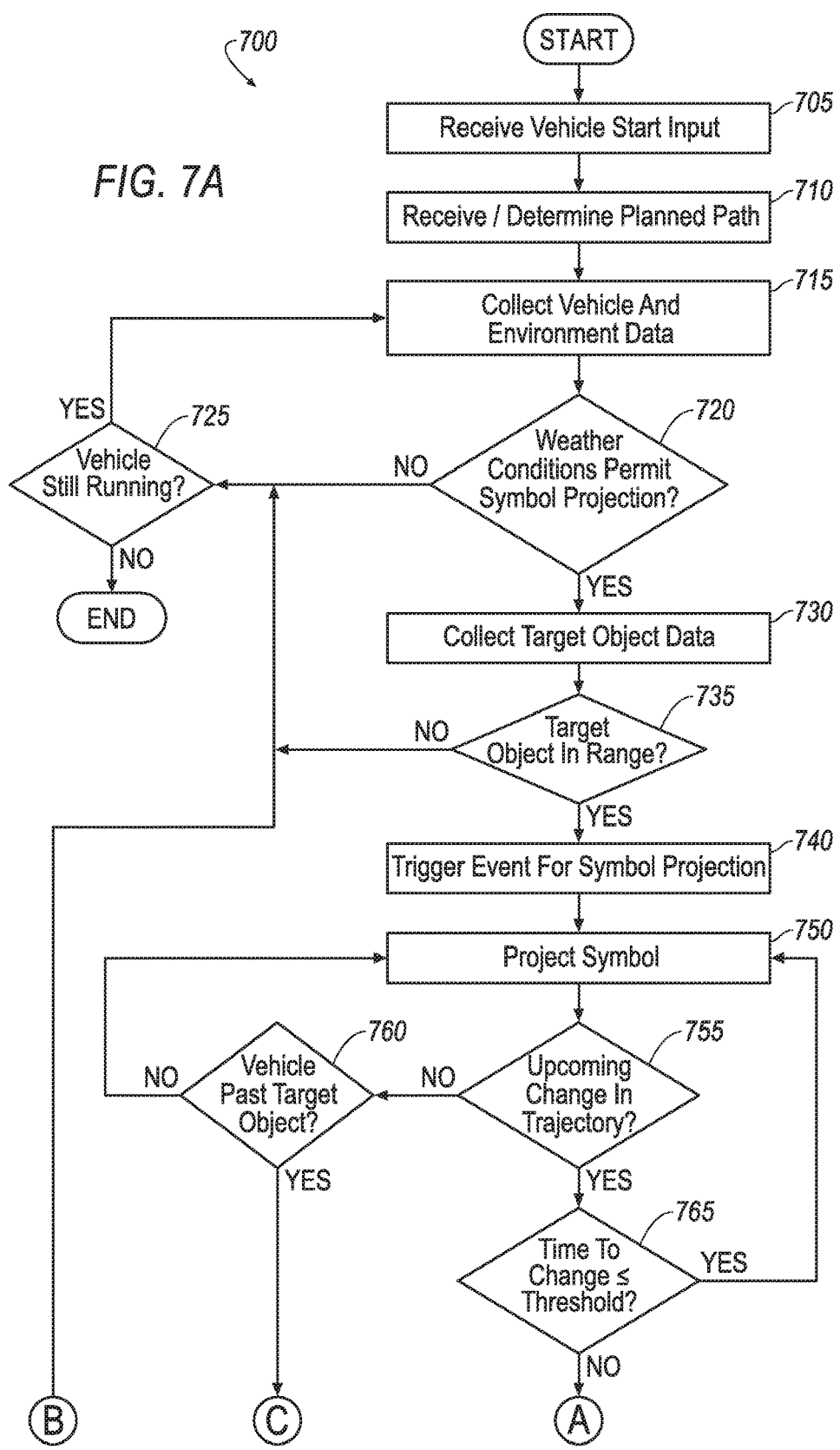

VEHICULAR IMAGE PROJECTION

BACKGROUND

Autonomous and semi-autonomous vehicles may share a road with pedestrians, cyclists and other vehicles, both autonomous and non-autonomous. The pedestrians, cyclists and other vehicles (which may be referred to as "target objects") may not be aware that they are in traffic with the autonomous vehicle. Further, the target objects, i.e., a human operator thereof, may be distracted by the use of mobile phones, conversations with other occupants, food, etc. When distracted, the target object operator may not make adequate observation of an environment around the target object, which may include traffic conditions such as other vehicles, traffic lights, traffic signs, etc. A problem exists in that technology has not been developed to identify and take action based on certain traffic conditions.

BRIEF DESCRIPTION OF THE DRAWINGS

FIG. 7A is a diagram of a first portion of an exemplary process for projecting the symbol for indicating the vehicle change of trajectory.

DETAILED DESCRIPTION

Figure 1:
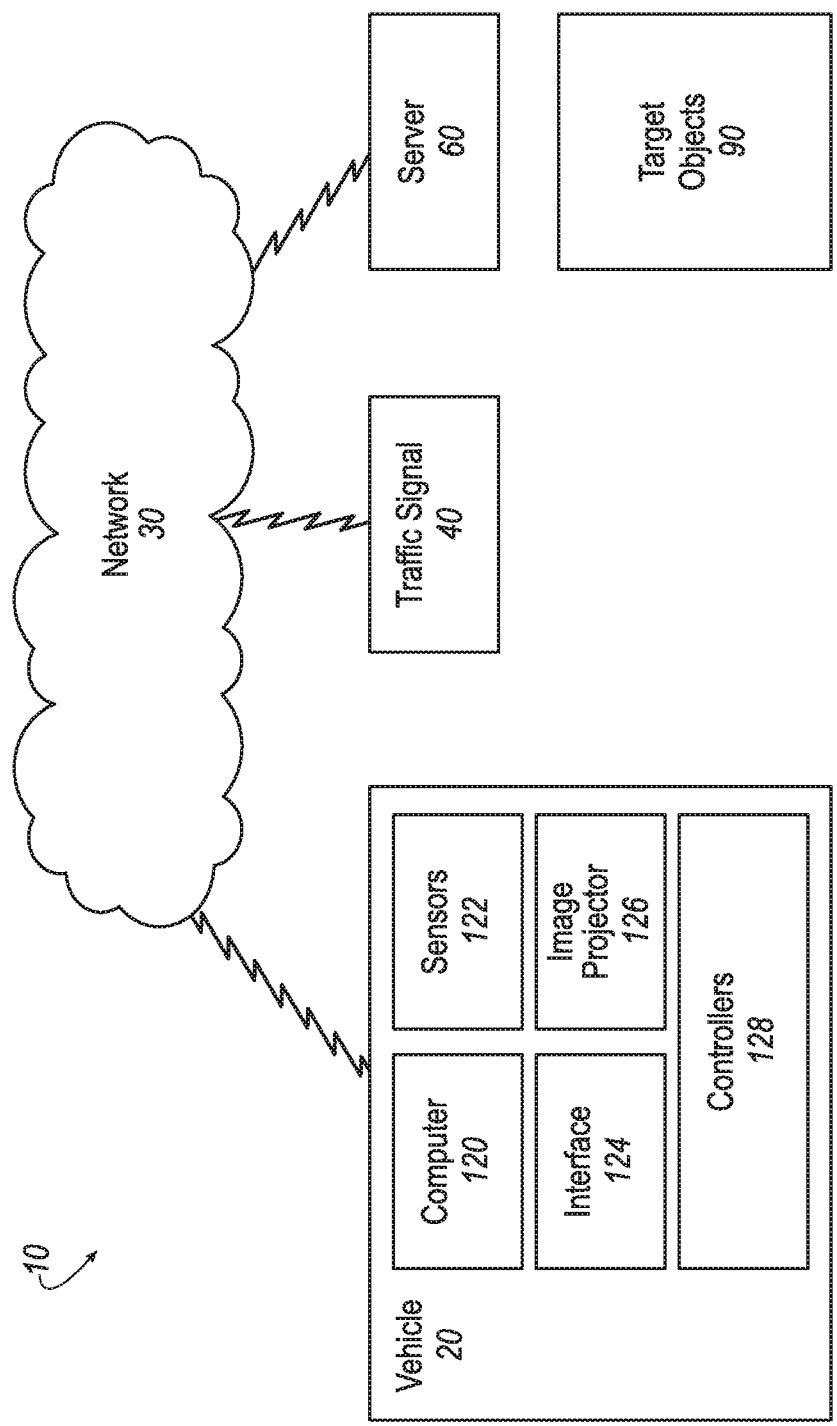
FIG. 1 is a block diagram of an example vehicular image projection system.

A computer is programmed to receive data indicating a state of a traffic signal; and activate a light source in a first vehicle to project a traffic signal symbol representing the state of the traffic signal. The computer is further programmed to project the traffic signal symbol based on a determination that the first vehicle is within a maximum distance from the traffic signal. The maximum distance is a predetermined distance. The computer can be further programmed to determine the maximum distance based on identifying the traffic signal.

The computer can further be programmed to determine, based on received data, a target object; and project the traffic signal symbol toward the target object. The target object may be one of a pedestrian, a cyclist and a second vehicle. The computer can be further programmed to project the traffic signal symbol within a maximum distance from the target object. The computer can be further programmed to determine the maximum distance from the target object based on a type of target object.

The computer can be further programmed to project the traffic signal symbol representing the state of the traffic signal by programming to include a first color of light in the symbol based on a second color of light emitted by the traffic signal. The computer can be further programmed to project the traffic signal symbol representing the state of the traffic signal by programming to project the symbol on a surface supporting the vehicle. The computer can be further programmed to receive the data indicating the state of the traffic signal via radio frequency communications.

The computer can be further programmed to receive visual data representing the traffic signal via a sensor and determine the state of the traffic signal based on the visual data. The computer can be further programmed to project the traffic signal symbol further based on a determination that the vehicle is stopped within a maximum distance from the traffic signal. The computer can be further programmed to project the traffic signal symbol further based on a determination that a target object is within a maximum distance of a planned travel path for the first vehicle. The computer can be further programmed to determine a line-of-sight of a target object; and project the traffic signal symbol along the line-of-sight. The computer can be further programmed to project the traffic signal symbol between a target object and a planned travel path for the first vehicle.

A method includes receiving data indicating a state of a traffic signal and activating a light source in a first vehicle to project a traffic signal symbol representing the state of the traffic signal. The method can further include projecting the traffic signal symbol based on a determination that the first vehicle is within a first maximum distance from the traffic signal. The method can further include determining, based on received data, a target object; and projecting the traffic signal symbol toward the target object. The method can further include projecting the traffic signal symbol within a second maximum distance from the target object.

Further disclosed is a computer programmed to execute any one of the above method steps. Yet further disclosed is a vehicle including the computer. Yet further disclosed is a computer program product, including a computer readable medium storing instructions executable by a computer processor, to execute any of the above method steps.

FIG. 1 is a diagram of an exemplary system 10 for projecting a symbol by a first vehicle 20 based on a detected traffic condition. Target objects 90, as used herein, refers to pedestrians, second vehicles, bicycles, motorcycles, scooters, skateboards, and other types of vehicles controlled by people. Target objects 90 may further include animals. For example, a deer on a side of a road could be the target object 90.

The system 10 includes a first vehicle 20, and a network 30. The system 10 may further include one or more traffic signals 40, and a server 60.

The first vehicle 20 is generally a land-based vehicle having three or more wheels, e.g., a passenger car, light truck, etc. The first vehicle 20 includes a computer 120, sensors 122, a human-machine interface (HMI) 124, an image projector 126 and controllers 128.

The first vehicle 20 can be an autonomous or semi-autonomous vehicle. In an autonomous first vehicle 20 the computer 120 controls the first vehicle 20 by sending instructions to controllers 128 including controllers for steering, propulsion (e.g., a powertrain with electric and/or internal combustion elements), and braking; in a semi-autonomous first vehicle 20 the computer 120 controls one or two of steering, propulsion, and braking.

The computer 120 includes a processor and a memory. The memory includes one or more types of computer-readable media, and storing instructions executable by the processor for performing various operations, including as disclosed herein. Further, the computer 120 may include and/or be communicatively coupled to one or more other computers, including vehicle components such as the sensors 122, the HMI 124, the image projector 126, and the controllers 128, which likewise may include respective processors and memories. Communications, i.e., communicative coupling, may be achieved via a controller area network (CAN) bus or local interconnect network (LIN) bus, a wired and/or wireless in-vehicle local area network (LAN), e.g., using wired or wireless technologies such as Wi-Fi®, Bluetooth®, etc., as is known.

As described in additional detail below, the computer 120 is programmed to receive and/or determine a planned travel path for the first vehicle 20. The planned travel path is the path the first vehicle 20 will steer along on a roadway. For example, the computer 120 may receive a route indicating a starting point, a destination, and the roads for the first vehicle 20 to follow to arrive at the destination. Based on the received route, and using autonomous vehicle control techniques as are known, the computer 120 may determine the planned travel path, i.e., specific points that the vehicle 20 will cover on roads, etc., along the route. That is, a route may specify a road or roads included on the route, and a travel path includes specific points covered on the road or roads as the vehicle 20 travels the route. The computer 120 is further programmed to detect traffic conditions such as a state of a traffic signal within a vehicle-signal distance threshold to the first vehicle 20, an intended change of trajectory of the first vehicle 20, the target object 90 within an object-path distance threshold to the planned travel path of the first vehicle 20, etc.

The vehicle-signal distance threshold is a maximum distance that the first vehicle 20 can be from the traffic signal 40 in order to trigger the projection of the symbol 164. The vehicle-signal distance threshold can be a predetermined distance such as ten meters. In one case, the predetermined distance can be the same for each traffic signal 40. In another case, the predetermined distance can be a predetermined distance for each traffic signal 40. In this case, the vehicle-signal distance threshold for each traffic signal 40 may be maintained in a vehicle-signal distance threshold table.

The object-path distance threshold is a maximum distance of the target object 90 to the planned travel path 208 in order to trigger the projection of the symbol. The object-path distance threshold can be a predetermined distance, such as ten meters. In other cases, the object-path distance threshold may depend on, for example, a location of the planned travel path 208 (on a street, a highway, in a city, in a rural area, etc.), a type of target object 90 (pedestrian, cyclist, second vehicle, etc.). In this case, the object-path distance threshold can be determined based on an object-path distance threshold table that provides object-path distance thresholds based on a geo-location of the planned travel path 208 and other factors.

Based on the detected traffic condition, the computer 120 instructs the image projector 126 to project the symbol, or change the currently projected symbol, whereby the symbol is viewable from the target object 90.

The sensors 122 are communicatively coupled with the computer 120 and may be programmed to collect data related to the first vehicle 20 and the environment in which the first vehicle 20 is operating. By way of example, and not limitation, sensors 122 may include cameras, LiDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, a global positioning system (GPS), etc.

The HMI 124 is communicatively coupled to the computer 120 in a known manner and includes one or more output devices such as a display, lamps, speakers, etc., for communicating data to a user. The HMI 124 further includes one or more input devices such as a touch screen display, buttons, a mouse, a keyboard, a microphone, a gesture recognition device, switches, etc., for receiving input from the user.

The HMI 124 can receive input from the user of the first vehicle 20. Input from the user may include a destination for the first vehicle 20, a schedule for the first vehicle 20, a route for the first vehicle, planned stops along the route for the first vehicle 20, etc.

The image projector 126 can project symbols on surfaces or in a direction that are external to the first vehicle 20. For example, the image projector 126 may project a symbol indicating that the first vehicle 20 is an autonomous vehicle on a road on which the first vehicle 20 is travelling. The image projector 126 includes one or more light sources, and a computer communicatively coupled with the computer 120, and may further include one or more actuators such as motors or solenoids. The light sources may include light emitting diodes (LEDs), light emitting laser diodes, fluorescent lamps, high-intensity discharge lamps, xenon lamps, halogen lamps, etc.

The image projector 126 can, based on instructions from the computer 120, generate and project the symbol in a direction external to, i.e., outwardly from a body surface of, the vehicle 20. As described in additional detail below, the image projector 126 may further be programmed to cause the symbol to move along or within a target area (e.g., move back and forth within a rectangular area, move along an arc shaped line), blink, change colors, etc. The target area is an area, determined by the computer 120, in which the symbol is projected, to increase the likelihood that the symbol will be detected by the target object 90. As discussed in additional detail below, the computer 120 may determine the target area based on a location of the target object 90, the type of the target object 90, a line-of-sight of the target object 90, a shortest straight line between the target object 90 and the planned travel path, or other factors that may impact the likelihood that the symbol will be detected by the target object 90.

The controllers 128 may be Electronic Control Units (ECUs) or the like such as are known and in any event include computers communicatively coupled with the computer 120, and may further be communicatively coupled to actuators such as motors, solenoids, relays, switches, etc. The controllers 128 are programmed to receive instructions from the computer 120, and based on the instructions, take actions such as controlling a direction of the first vehicle 20, providing propulsion to the first vehicle 20, braking the first vehicle 20, etc.

The network 30 is one or more mechanisms by which the first vehicle 20, the traffic signal 40 and the server 60 communicate with each other, and may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks include wireless communication networks (e.g., using one or more of cellular, Bluetooth®, IEEE 802.11, etc.), local area networks (LAN) and/or wide area networks (WAN), including the Internet, providing data communication services.

The types of wireless communications may include one or more of cellular, Bluetooth®, IEEE 802.11 (typically, Wi-Fi®), dedicated short range communications (DSRC), two-way satellite (e.g., emergency services), one-way satellite (e.g., receiving digital audio radio broadcasts), AM/FM radio, etc.

The traffic signal 40 can generate signals such as a blinking light, colored lights (e.g., standard green, yellow, red traffic lights), a display such as the display of a traffic sign (e.g., a stop sign or arrow on an LED display), a speed of a vehicle (e.g., radar activated signs that indicate a vehicle's speed as it is approaching), etc., in order to control traffic. The traffic signal 40 may include a computer, a light source, a display, and one or more actuators. For example, the traffic signal 40 may include green, yellow and red lamps, which may be activated to control traffic at an intersection, as is known.

In addition, the traffic signal 40 may be communicatively coupled with the first vehicle 20. The traffic signal 40 may be programmed to transmit a current state or a planned future state of the traffic signal 40 to the first vehicle 20. For example, the traffic signal 40 may transmit to the first vehicle 20, via the network 30, a message that the current state of the traffic signal 40 is "green" for a particular direction of the traffic signal 40 (e.g., facing the first vehicle 20). Further, the traffic signal 40 may communicate a planned future state. For example, the traffic signal 40 may communicate that it will change from the state "green" to a state "red" in a time period. The time period may be chosen to provide the target object 90 time to prepare for the change, for example two seconds.

The server 60 is a computer including a processor and a memory, the memory storing instructions which may be executed by the processor. The server 60 is communicatively coupled, via the network 30 with the first vehicle 20 computer 120 and the one or more traffic signals 40.

The server 60 may be programmed to perform one or more of the functions described in reference to the computer 120 in the first vehicle 20. For example, the server 60 may be programmed to receive or determine the planned travel path for the first vehicle 20. As described in additional detail below, the server 60 may further be programmed to receive data from the first vehicle 20 regarding a first vehicle 20 status, and based on the data, to detect traffic conditions such as a state of a traffic signal 40 within the vehicle-signal distance threshold to the first vehicle 20, an intended change of trajectory of the first vehicle 20, the target object 90 within the object-path distance threshold of the planned travel path of the first vehicle 20, etc. The first vehicle 20 status is a set of data describing the operating condition (location, speed, direction of travel, current planned travel path, etc.) of the first vehicle 20. The first vehicle 20 status data can further include internal operating conditions such as engine speed, engine temperature, amount of fuel, tire pressure, etc.). Based on the detected traffic condition, the server 60 may generate and transmit instructions to the computer 120 in the first vehicle 20 to project one or more symbols and/or to modify one or more currently projected symbols.

Additionally, the server 60 may be programmed to provide data to the first vehicle 20 related to the first vehicle 20 and its environment. For example, the server 60 may supply location data related to the first vehicle 20, map data related to the location of the first vehicle 20, the location of the one or more traffic signals 40 along the travel path of the first vehicle 20, traffic data indicating a location and trajectory of target objects 90 along the travel path of the first vehicle 20, light conditions along the travel path of the first vehicle 20, etc.

Figure 2:
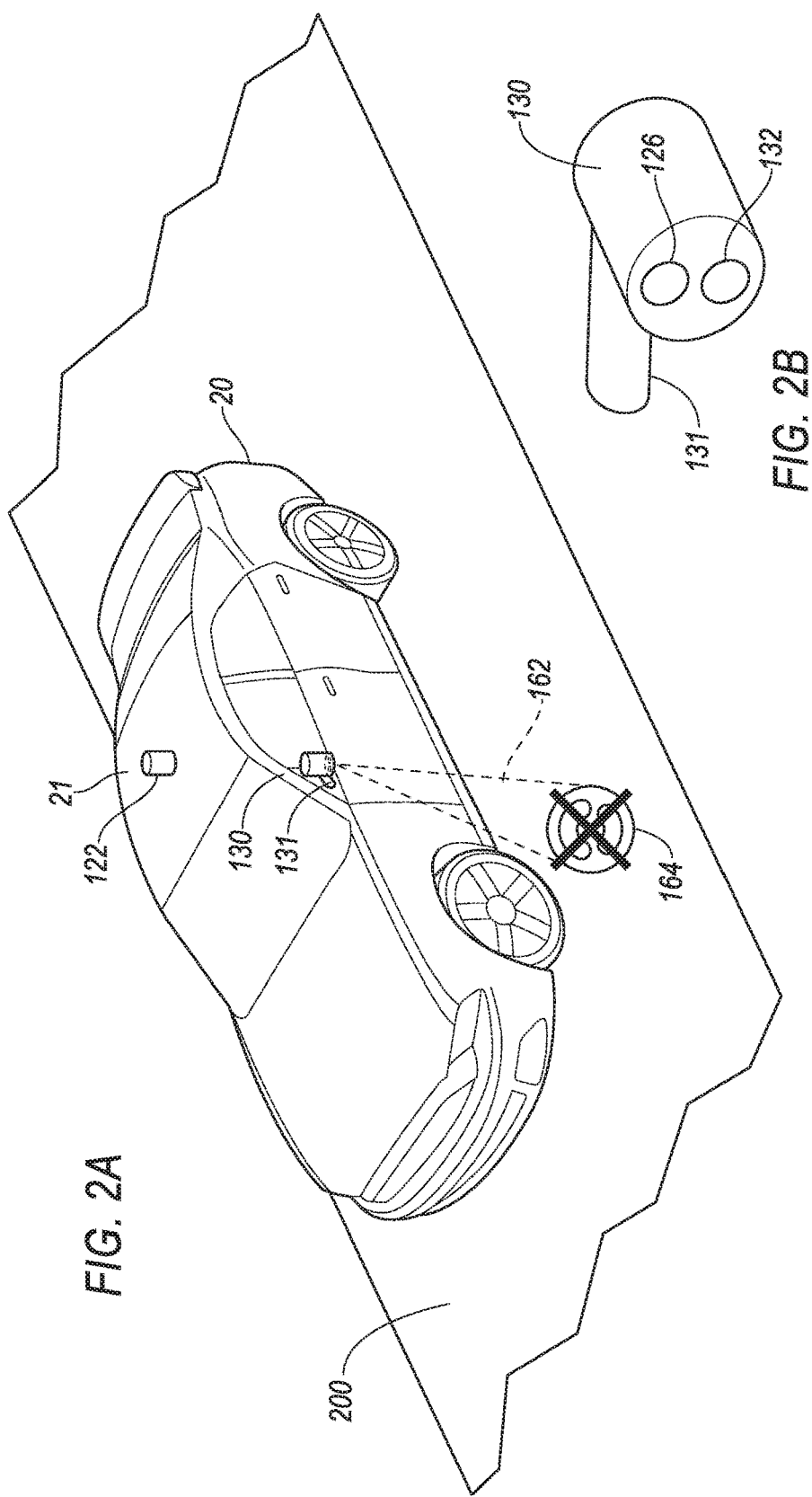
FIG. 2A is a perspective view of a vehicle including an image projector.
FIG. 2B is a perspective view of a housing for a puddle lamp including the image projector.

FIG. 2 is a perspective view of the first vehicle 20. As described above, the first vehicle 20 includes one or more sensors 122 and the image projector 126. FIG. 2 illustrates one sensor 122 on a top 21 (e.g., a roof) of the first vehicle 20. Typically, the first vehicle 20 includes a plurality of sensors 122 located throughout the first vehicle 20, not shown in FIG. 2 for ease of illustration.

As illustrated in FIG. 2, the image projector 126 may be included in a common housing 130 and/or on a common bracket 131 with a puddle lamp 132. Including the image projector 126 in the common housing 130 with the puddle lamp 132 may conserve wiring and connecting costs related to connecting the image projector 126 to the computer 120. Additionally, or alternatively, the image projector 126 may be located at other locations on the first vehicle 20, for example, in a headlamp cavity, on a bumper, together with an external mirror, etc.

The image projector 126 can generate the symbol 164 and project the symbol 164 via a light beam 162. As shown in FIG. 2, the image projector 126 may project the symbol 164 on a surface supporting the vehicle such as a road 200. Additionally, or alternatively, the image projector 126 may project the symbol 164 onto any other surface within a range of the image projector 126, for example on a sidewalk, a ground surface, etc. The range of the image projector 126 may be a distance that the image projector 126 can project the symbol 164 as determined by a strength of the light beam 162, a level of light in the environment of the first vehicle 20, obstacles in the environment to projecting the symbol 164, etc.

The symbol 164 may communicate to the target object 90 that the first vehicle 20 is an autonomous vehicle. Additionally, or alternatively, as described in additional detail below, the symbol 164 may indicate the travel path of the first vehicle 20, a change in trajectory (starting, stopping, accelerating, decelerating, turning, etc.), of the first vehicle 20, a traffic condition such as the state of a traffic signal 40, etc. The symbol 164 may further be generated to move along the target area, blink, change color, change in shape, and/or include other dynamic features.

Figure 3:
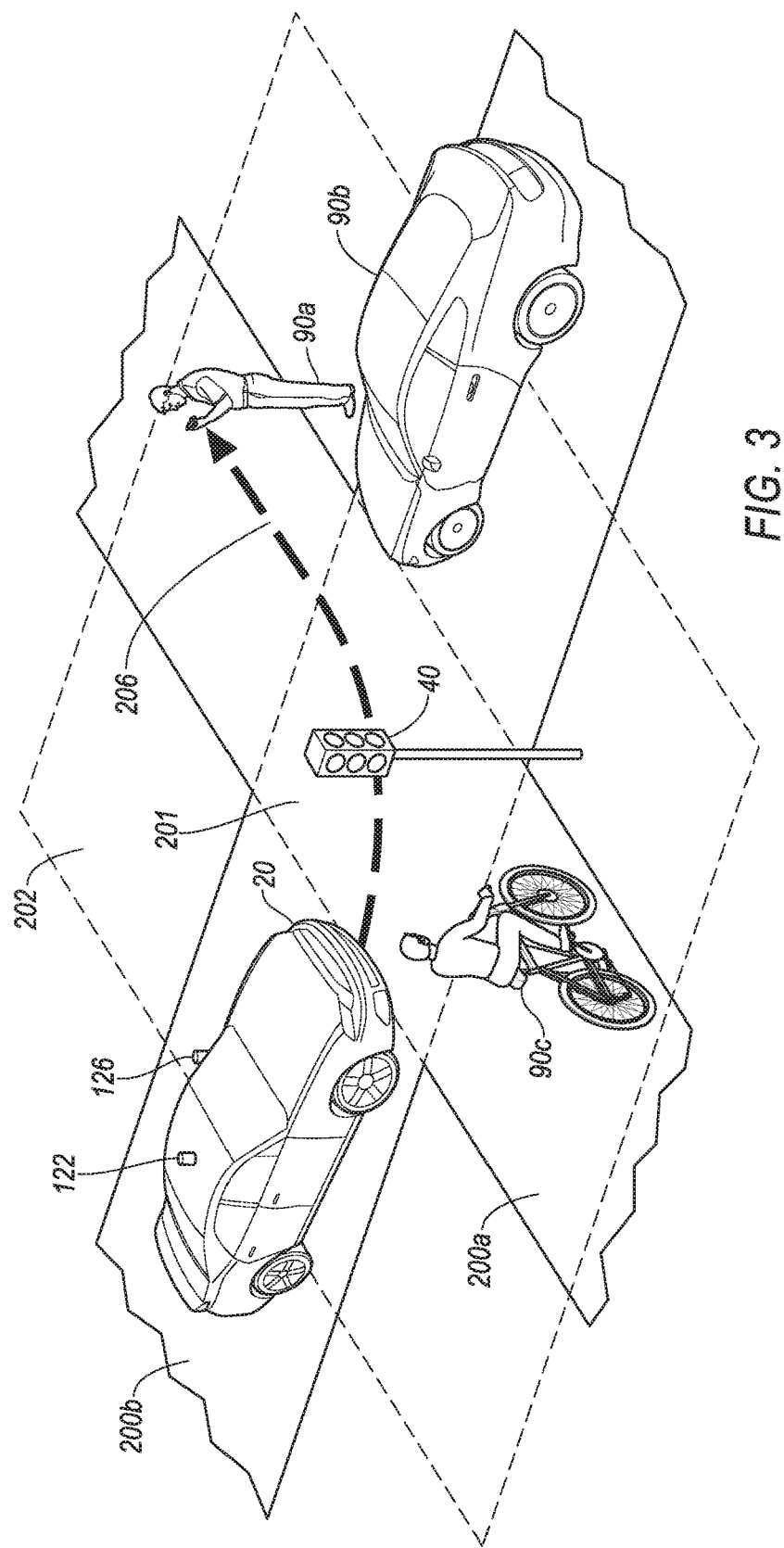
FIG. 3 is a diagram of an example vehicle illustrating a vehicle travel path.

FIG. 3 is a diagram of an example first vehicle 20 on a first vehicle travel path 208. The first vehicle 20 is at an intersection 201 of first and second roads 200a, 200b. The traffic signal 40 is located within a first range 202 of the intersection 201. The intersection 201 is defined to mean the area where the first and second roads 200a, 200b cross. A first range 202 of the intersection 201 may be used to determine or identify whether the traffic signal 40, or other objects (including target objects 90) are associated with, or current proximate to the intersection 201. The first range 202 may be defined as a range extending beyond the intersection 201 a first fixed distance, e.g., three meters, in every direction from the intersection 201. Additionally, or alternatively, the first range 202 may be predetermined and can define an irregular shape. The first range 202 can be included in map data indicating that the traffic signal 40 is associated with the intersection 201 and the first range 202 surrounding the intersection 201. For example, the first range 202 may be an irregular shape surrounding the intersection 201, designed by a developer of the map data, to include traffic signals 40, traffic signs, etc. associated with the intersection 201.

The first vehicle 20 has the planned travel path 208. In the example of FIG. 3, the planned travel path 208 for the first vehicle 20 is to turn left through the intersection 201 and continue out of the intersection 201 on the first road 200a.

As further shown in FIG. 3, the traffic condition may include one or more target objects 90 such as a pedestrian 90a, a second vehicle 90b, and/or a cyclist 90c within the object-path distance threshold of the planned travel path 208. The object-path distance threshold is a maximum distance between the target object 90 and the travel path 208 for which the computer 120 is programmed to instruct the image projector 126 to project the symbol 164.

The object-path distance threshold may be a fixed distance such as 10 meters, as measured to a point on the travel path 208 that is closest to the target object 90. Additionally, or alternatively, the computer 120 may calculate the object-path distance threshold based on a type or characteristic of the target object 90 and/or factors in the environment. For example, the computer 120 may determine the object-path distance threshold to be 10 meters for the pedestrian 90a, 20 meters for the second vehicle 90b and 15 meters for the cyclist 90c. As another example, the computer 120 may determine the object-path distance threshold based on other conditions that might influence a likelihood that an interaction or collision could occur between the first vehicle 20 and the target object 90. For example, the computer 120 may consider the type of road (street without sidewalk, street with sidewalk, intersection, highway, etc.) where the target object 90 is located, a current trajectory (speed and direction) of the target object, a current trajectory (speed and direction) of the first vehicle 20, etc. for determining the object-path distance threshold. The computer 120 may include a table of object-path distance thresholds that indicates the object-path distance threshold based on relevant factors such as the type of target object, the type of road, etc. The computer 120 may then determine relevant factors and retrieve the object-path distance threshold from the table of object-path distance thresholds.

Figure 4:
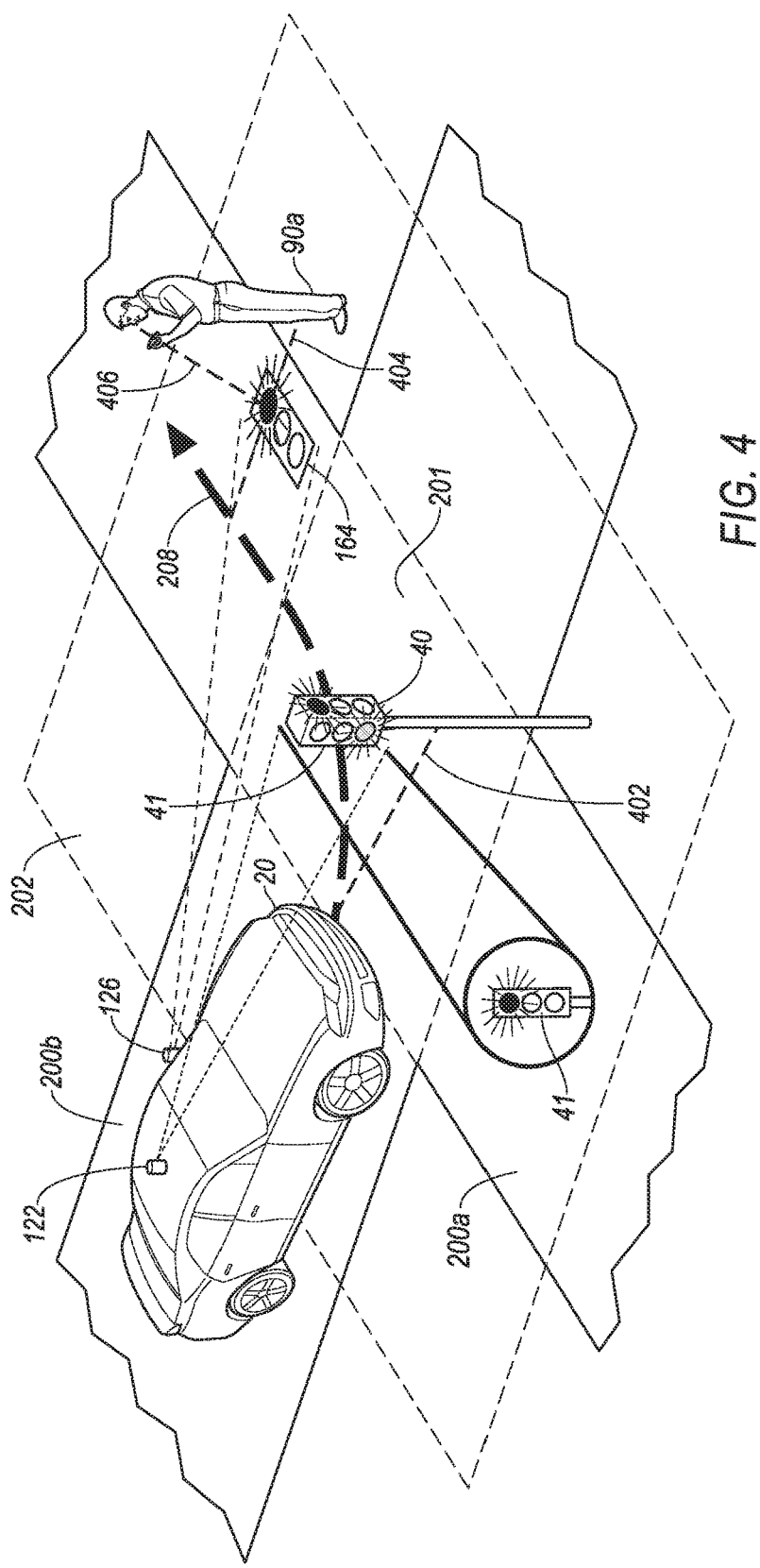
FIG. 4 is a diagram of an example vehicle projecting a traffic signal symbol.

FIG. 4 is a diagram of an example traffic condition that includes the first vehicle 20. Further in the example illustration, the image projector 126 of the first vehicle 20 is projecting the symbol 164 indicating a state of the traffic signal 40. The traffic signal 40 is in the first range 202 of the intersection 201. A face 41 of the traffic signal 40 is emitting a red light toward the first vehicle 20. Accordingly, the traffic signal 40 is in a "red state" for travel through the intersection 201 in the direction of travel of the first vehicle 20.

The first vehicle 20 is stopped at the first intersection 201 and is a vehicle-signal distance 402 away from the traffic signal 40. The vehicle-signal distance 402 is the distance between the first vehicle 20 and the traffic signal 40. The pedestrian 90a is standing at a corner of the intersection 201 and looking down at a pedestrian's mobile telephone. A line-of-sight 406 of the pedestrian 90a extends from a face of the pedestrian toward the pedestrian's mobile telephone and further to the first road 200a. The pedestrian 90a is a representative example of the target object 90 that may be included in the example traffic condition.

As described below, the computer 120 in the first vehicle 20 receives traffic signal data indicating the state of the traffic signal 40 and further receives data regarding an object location of the target object 90. Based on the traffic signal data and the object location of the target object 90, the image projector 126 projects the traffic signal symbol 164 to indicate the state of the traffic signal 40.

The computer 120 may instruct the image projector 126 to project the traffic signal symbol 164 of the traffic signal 40 to a symbol location within an object-symbol range of the target object 90. The object-symbol range indicates a maximum distance from the target object 90 for projecting the traffic signal symbol 164. The object-symbol range may be determined to increase a likelihood that the target object 90 will see the traffic signal symbol 164. For example, the object-symbol range may be a fixed distance such as one meter from the target object 90, in order to increase the likelihood that the traffic signal symbol 164 will appear in a peripheral vision of, or otherwise be detected by the target object 90. Alternatively, the object-symbol range may be determined based on the type of target object 90. For example, for a pedestrian 90a or a cyclist 90c, the object-symbol range may be determined to be one meter. For the second vehicle 90b, the object-symbol range may be determined to be three meters, and further determined to be on a particular side to account for a line-of-sight of a driver looking through a windshield of the second vehicle 90b.

Additionally, or alternatively, the computer 120 may determine the symbol location for projecting the traffic signal symbol 164 based on the location of the target object 90 relative to the planned travel path 208 of the first vehicle 20. For example, the computer 120 may instruct the image projector 126 to project the traffic signal symbol 164 between the target object 90 and the planned travel path 208. In one example, the computer 120 may identify a shortest straight line path 404 between the target object 90 and the planned travel path 208 for the first vehicle 20, and instruct the image projector 126 to project the traffic signal symbol 164 at the symbol location along the shortest straight line path 404.

Still further, the computer 120 may determine the symbol location for projecting the traffic signal symbol 164 based on the line-of-sight of the target object 90. In the case of the pedestrian 90a, the computer 120 may use object or facial recognition systems such as are known to determine the line-of-sight 406 of the pedestrian 90a, and instruct the image projector 126 to project the traffic signal symbol 164 along the line-of-sight 406.

In the case of the second vehicle 90b, the computer 120 may determine which direction the second vehicle 90b is facing, and instruct the image projector 126 to project the traffic signal symbol 164 in front of the second vehicle 90b. Directional indicators such as "front", "in front of," "behind," "front end," "rear end," "left," "right," as used herein for the second vehicle 90b, are referenced to a driver sitting in a driver's seat facing toward the steering wheel.

Figure 5:
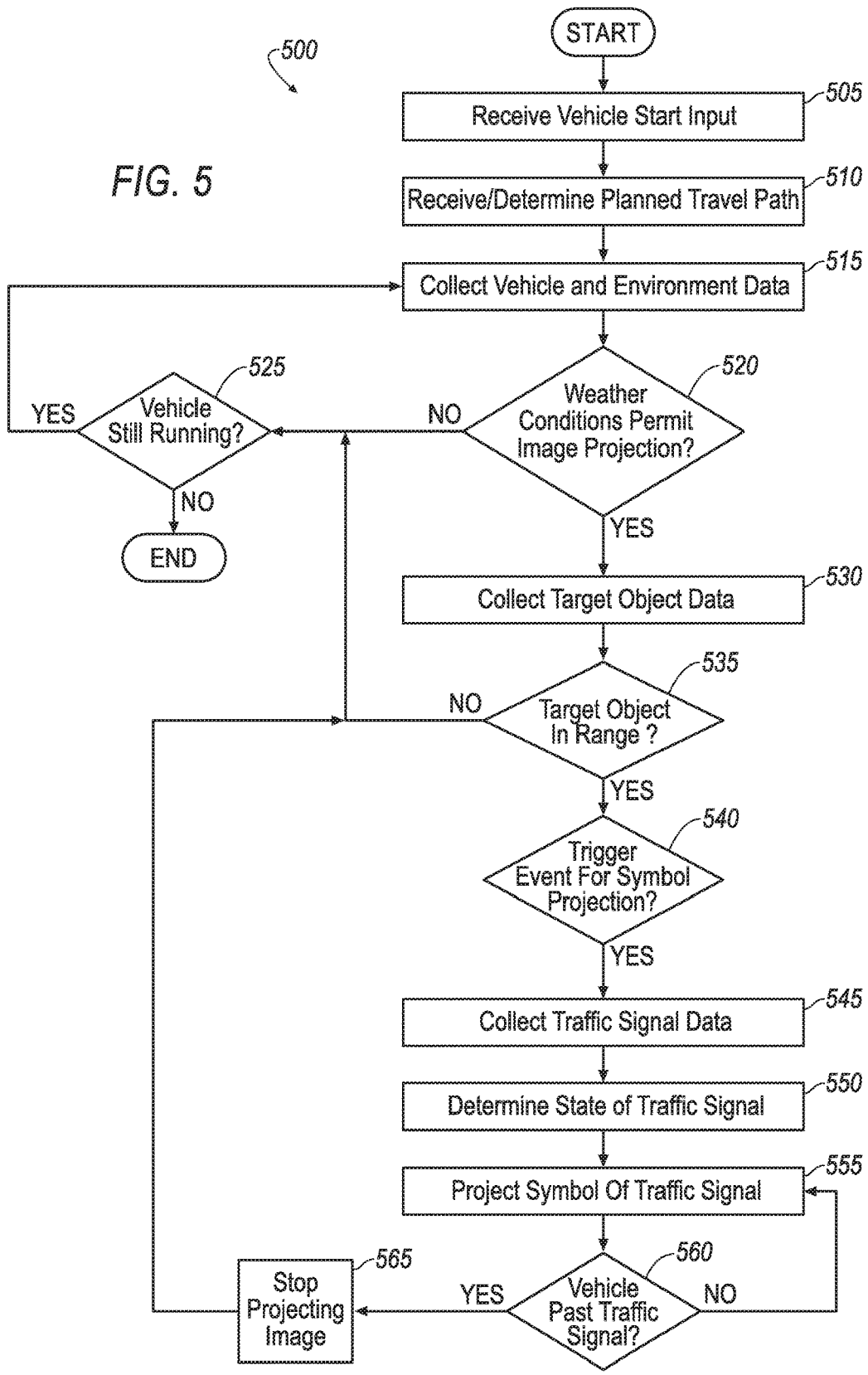
FIG. 5 is a diagram of an exemplary process for projecting a symbol based on a traffic signal state.

FIG. 5 is a diagram of an exemplary process 500 for projecting the traffic signal symbol 164 indicating a state of the traffic signal 40. The process 500 begins in a block 505.

In the block 505, the computer 120 in the first vehicle 20 receives an input indicating that the first vehicle 20 is being started. For example, the first vehicle 20 may receive an input from the user of the first vehicle 20, via the HMI 124 that the user would like to start a trip. As another example, the computer 120 may identify a trigger event (e.g., a scheduled pick-up), indicating that the first vehicle 20 is requested to travel to a location. Upon receiving the input indicating that the first vehicle 20 is being started, the process 500 continues in a block 510.

In the block 510, the computer 120 determines or receives the planned travel path 208 for the first vehicle 20. As a first example, the computer 120 may receive route data such as a destination from the user of the first vehicle 20. Based on the destination, and additional data such as map data, the computer 120 and/or another computer communicatively coupled with the computer 120 may determine the first vehicle route, using known route planning techniques.

Based on the first vehicle route, the computer 120 may determine, at points along the route, the planned travel path 208 for the first vehicle 20, using known autonomous vehicle control techniques. The planned travel path 208 is the path the first vehicle 20 will steer along on the first and second roads 200a, 200b, i.e., as explained above, points on a road or other ground surface that the vehicle 20 will cover as it moves. Alternatively, the computer 120 may receive the planned travel path 208 from another computer in the first vehicle 20, or from the server 60. Upon determining or receiving the planned travel path 208, the process 500 continues in a block 515.

In the block 515, the computer 120 collects first vehicle data and environment data. First vehicle data in this context includes data indicating operating conditions of the first vehicle such as trajectory (speed and direction), location, tire pressure, engine speed, fuel level, number of occupants, etc. Environment data is data that indicates conditions of the environment in which the first vehicle 20 is operating such as weather conditions, light conditions, road conditions, topological conditions, objects in the environment, etc. The computer 120 may collect, for example, global positioning system (GPS) data indicating a location, i.e., geo-coordinates, of the first vehicle 20. The computer 120 may further receive data indicating target objects 90, weather conditions, light conditions, etc. at the first vehicle location. Additionally, the computer 120 may collect data indicating target objects 90, weather conditions, light conditions, etc., along the planned travel path 208 of the first vehicle 20. Upon collecting the first vehicle data and data related to the environment of the first vehicle 20, the process 500 continues in the block 520.

In the block 520, the computer 120 may determine whether weather conditions permit projecting symbols 164 by the first vehicle 20. For example, the computer 120 may consider a brightness of the environment at the first vehicle location. In the case that it is a bright, sunny day, with a light intensity from the sun above a predetermined light intensity level, the computer 120 may determine that weather conditions do not permit projecting symbols 164 for the first vehicle 20. In this case, the process 500 continues in a block 525. On the other hand, in the case that the light intensity from the sun is below the predetermined light intensity level, the computer 120 may be programmed to determine that weather conditions permit projecting symbols 164 by the first vehicle 20. In this case, the process 500 continues in a block 530.

In the block 525, the computer 120 determines whether the first vehicle 20 is still running. For example, the computer 120 may collect data indicating that an ignition of the first vehicle 20 is still turned on, that an engine of the first vehicle 20 is still running, and/or an electric motor in a powertrain is engaged, etc. In the case that the first vehicle 20 is still running, the process 500 continues in the block 515. In the case that the first vehicle 20 is no longer running, the process 500 ends.

In the block 530, the computer 120 collects data related to target objects 90 within a data collection range of the first vehicle 20. The computer 120 may collect visual data, LIDAR data, radar data, etc. that indicates locations of respective target objects 90 and further indicates features of the target objects 90 such as the type (pedestrian, vehicle, bicycle, etc.) of the respective target objects 90, a trajectory of the respective target objects 90, a direction that the respective target object 90 is facing, the line-of-sight of the respective target object 90, etc.

The data collection range of the first vehicle 20 may be, for example a range within which the sensors 122 detect target objects 90 and features of the target objects 90. In one case, each sensor 122 may have a different range within which the respective sensor 122 detects target objects 90 and features of the target objects 90. In this case, the data collection range of the first vehicle 20 may be a superposition of the detection range of each of the individual sensors 122. Alternatively, the data collection range may be, for example, a fixed distance from the first vehicle 20, such as 500 meters. Upon collecting data related to the target objects 90 with the data collection range, the process continues in a block 535.

In the block 535, the computer 120 determines whether at least one of the target objects 90 is within a target range. The target range is a range within which the target object 90 triggers traffic symbol projection toward the target object 90.

The target range may be defined as the planned travel path 208 of the first vehicle 20 plus an area surrounding the planned travel path 208. As one example, the target range may be defined as the planned travel path 208 plus an area extending the object-path distance threshold from the planned travel path 208 on either side.

In another example, the target range may be defined to include the planned travel path 208, the area extending the object path distance threshold from the planned travel path 208 on either side, and in addition include the first range 202 surrounding the intersection 201, as discussed in reference to FIG. 3.

In another example, the target range may be defined as the object-signal distance threshold of the traffic signal 40. The object-signal distance threshold may be, for example, a fixed distance such as 10 meters. The computer 120 may determine that the target object 90 is within the target range in the case that the target object 90 is within the object-signal distance threshold of the traffic signal 40.

In the case that the computer 120 determines that the target object 90 is within the target range, the process continues in a block 540. Otherwise, the process 500 continues in the block 525.

In the block 540, the computer 120 determines whether a trigger event for projecting the symbol 164 is present. The trigger event is a traffic condition that, when detected by the first computer 120, causes the first computer 120 to instruct the image projector 126 to project the symbol 164. Example trigger events may include that the first vehicle 20 is stopped at the traffic signal 40, that the first vehicle 20 is entering the intersection 201, or that the first vehicle 20 is stopped in the intersection 201 waiting for an opportunity to turn left. As another example, the trigger event may be that the first vehicle 20 is within a vehicle-object distance threshold of the target object 90, etc. The vehicle-object distance threshold may be a maximum distance between the first vehicle 20 and the target object 90 that triggers projecting the symbol 164. The vehicle-object distance threshold may be, for example, a predetermined distance such as 50 meters. Alternatively, the vehicle-object distance threshold may be determined based on one or more factors such as the type of object (second vehicle, cyclist, pedestrian, person on rollerblades, etc.), a location (rural area, suburb, city street, busy intersection), vehicle trajectory (speed, direction, direction relative to the object), etc. The computer 120 may maintain or access a table of vehicle-object distance thresholds, and based on the factors, look up an applicable vehicle-object distance threshold based on the factors.

As another example, the computer 120 may determine that the first vehicle 20 is within the vehicle-signal distance threshold of the traffic signal 40. For example, the computer 120 may determine that the vehicle-traffic signal distance 402 is less than the vehicle-signal distance threshold. In the case that the computer 120 determines that the trigger for projecting the symbol 164 is present, the process 500 continues in a block 545. In the case that the computer 120 does not determine the presence of the trigger event, the process 500 continues in the block 525.

In the block 545, the computer 120 collects data indicating the state of the traffic signal 40. The state of the traffic signal 40 is a color of light emitted by the traffic signal 40 on the face 41 of the traffic signal 40 facing toward the first vehicle 20.

In one case, the traffic signal 40 may be communicatively coupled with the computer 120 via the network 30. In this case, the computer 120 may receive the data indicating the state of the traffic signal 40 via radio frequency communications. In another case, the computer 120 may collect data indicating the state of the traffic signal 40 via sensors 122. As seen in FIG. 4, the sensor 122 may capture a visual image of the face 41 of the traffic signal 40 facing the first vehicle 20. Upon collecting the data indicating the state of the traffic signal 40, the process 500 continues in a block 550.

In the block 550, the computer 120 determines the state of the traffic signal 40. In the case of receiving the city the traffic signal 40 via radio frequency communications, the state of the traffic signal 40 may be directly obtained from the communications. In the case of capturing the visual image data representing the state of the traffic signal, the computer 120 may use object recognition as is known to determine the state of the traffic signal 40. Upon determining the state of the traffic signal 40, the process 500 continues in a block 555.

In the block 555, the computer 120 projects, via the image projector 126 in the first vehicle 20, the traffic signal symbol 164 indicating the state of the traffic signal 40. The computer 120 may instruct the image projector 126 to project the traffic signal symbol 164 in a direction determined based on the location of the target object 90.

The computer 120 may instruct the image projector 126 to project the traffic signal symbol 164 toward the target object 90. For example, the computer 120 may instruct the image projector 126 to project the traffic signal symbol 164 within the object-symbol range as described above. Additionally, or alternatively, the computer 120 may instruct the image projector 126 to project the traffic signal symbol 164 along the line-of-sight 406 of the target object 90.

As another example, the computer 120 may instruct the image projector 126 to project the traffic signal symbol 164 along the shortest straight line path 404 between the target object 90 and the planned travel path 208 of the first vehicle 20. Also in this case, the computer 120 may additionally consider the object-symbol range in determining the location for projecting the symbol 164.

The traffic signal symbol 164 may indicate the state of the traffic signal 40. For example, in the case that the traffic signal 40 is in the "red" state in the direction facing the first vehicle 20, the traffic signal symbol 164 may be a symbol of the traffic signal 40 (or a generic traffic signal) indicating the "red" state. Upon projecting the traffic signal symbol 164, the process 500 continues in a block 560.

In the block 560, the computer 120 determines whether the first vehicle 20 is past the traffic signal 40. The computer 120 may determine, for example, the that the vehicle-signal distance 402, indicating the distance of the first vehicle 20 to the traffic signal 40, is no longer less than the vehicle-signal distance threshold. As another example, the computer 120 may determine that the traffic signal 40 is behind the first vehicle 20, and that the trajectory of the first vehicle 20 is away from the traffic signal 40. Upon determining that the first vehicle 20 is past the traffic signal 40, the process 500 continues in a block 565.

In the block 565, the computer 120 instructs the image projector 126 to stop projecting the traffic signal symbol 164. Upon stopping to project the traffic signal symbol 164, the process 500 continues in the block 525.

Figure 6:
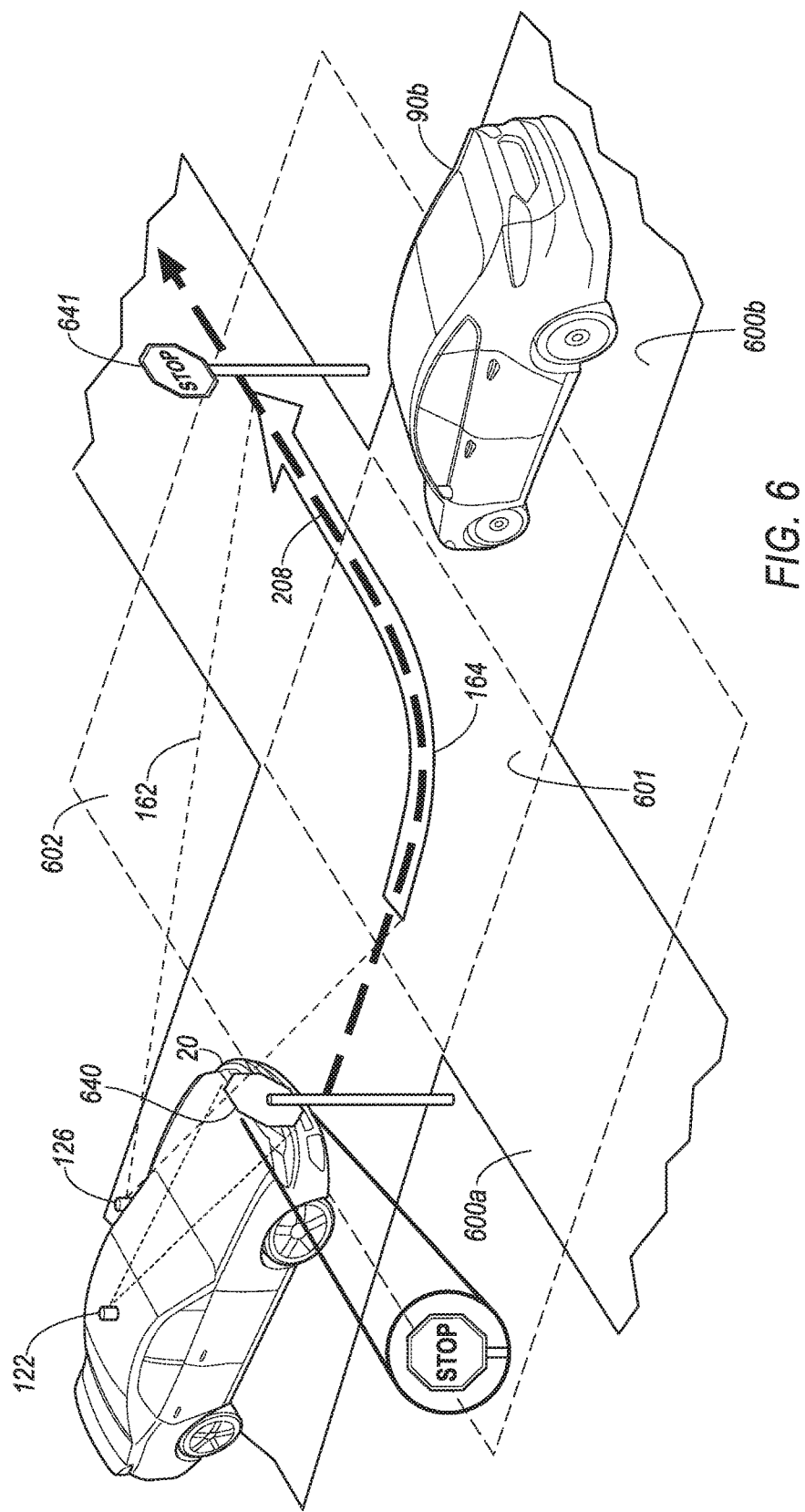
FIG. 6 is a diagram of an example vehicle projecting a symbol for indicating a vehicle change of trajectory.

FIG. 6 is a diagram of the image projector 126 in the first vehicle 20 projecting a symbol 164 indicating the first vehicle 20 trajectory. The first vehicle 20 is stopped at a first stop sign 640 before entering an intersection 601. The intersection 601 is an area where the first and second roads 600*a*, 600*b* cross. A second vehicle 90*b* is stopped at a second stop sign 641. The second vehicle 90*b* is entering the intersection 601 in an opposing direction to the first vehicle 20, and is stopped at a second stop sign 641. The first vehicle 20 has the planned travel path 208. The planned travel path 208 is to enter the intersection 601 and turn left.

A first range 602 of the intersection 601 may be used to determine or identify whether the first and second stop signs 640, 641, or other objects (including target objects 90) are associated with, or proximate to the intersection 601. The first range 602 may be defined as a range extending beyond the intersection 601 a first fixed distance, e.g., three meters, in every direction from the intersection 601. Additionally, or alternatively, the first range 602 may be predetermined, and included in map data indicating that the first and second stop signs 640, 641 are associated with the intersection 601 and the first range 602 surrounding the intersection 601. For example, the first range 602 may be an irregular shape surrounding the intersection, designed by the developer of the map data, to include the first and second stop signs 640, 641, traffic signals, etc. associated with the intersection 601.

The computer 120 projects, via the image projector 126, the trajectory symbol 164 indicating the planned travel path 208.

Figure 7B:
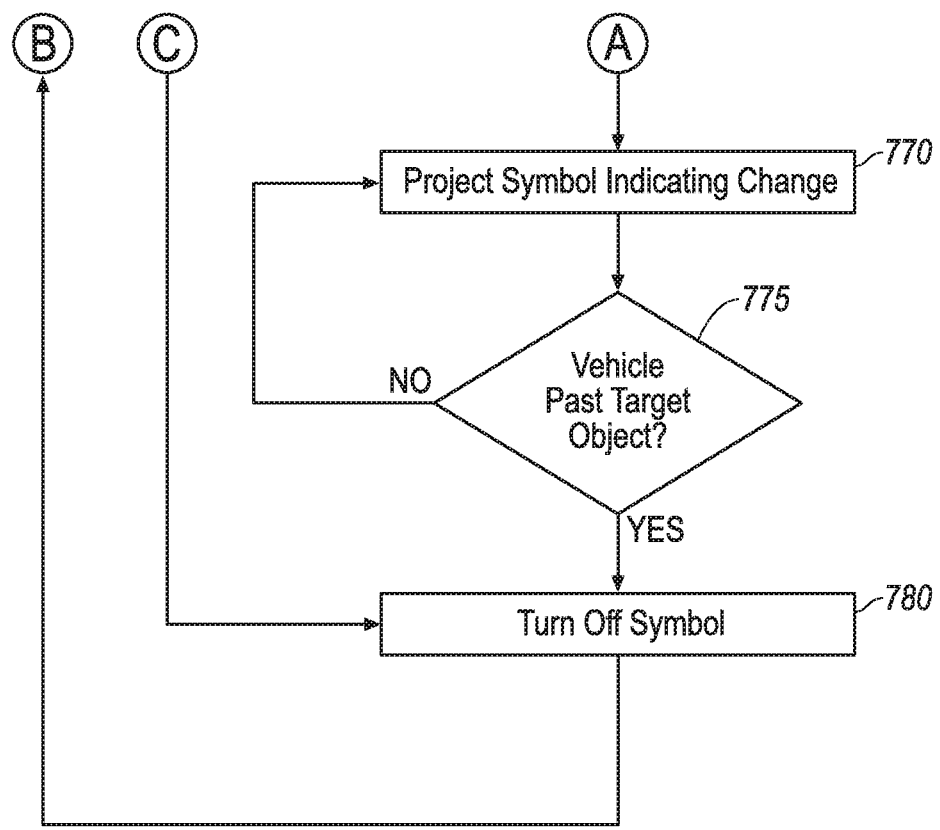
FIG. 7B is a diagram of the second portion of the exemplary process of FIG. 7A.

FIGS. 7A and 7B are a diagram of an exemplary process 700 for projecting the trajectory symbol 164 indicating a vehicle change of trajectory. The process 700 begins in a block 705.

In the block 705, the computer 120 in the first vehicle 20 receives an input indicating that the first vehicle 20 is being started as described above in reference to the block 505. Upon receiving the input indicating that the first vehicle 20 is being started, the process 700 continues in a block 710.

In the block 710, the computer 120 determines or receives the planned travel path 208 for the first vehicle 20 as described above in reference to the block 510. Upon determining or receiving the planned travel path 208, the process 700 continues in a block 715.

In the block 715, the computer 120 collects vehicle and environment data related to the first vehicle 20 as described in reference to the 515. Upon collecting the vehicle and environment data, the process 700 continues in the block 720.

In the block 720, the computer 120 may determine whether weather conditions permit projecting symbols by the first vehicle 20 as described in reference to block 520. In the case that the weather conditions do not permit projecting symbols by the first vehicle 20, the process 700 continues in a block 725. In the case that weather conditions do permit projecting symbols by the first vehicle 20, the process 700 continues in a block 730.

In the block 725, the computer 120 determines whether the first vehicle 20 is still running. For example, the computer 120 may collect data indicating that an ignition of the first vehicle 20 is still turned on, that an engine of the first vehicle 20 is still running, and/or an electric motor in a powertrain is engaged, etc. In the case that the first vehicle 20 is still running, the process 700 continues in the block 715. In the case that the first vehicle 20 is no longer running, the process 700 ends.

In the block 730, which follows the block 720, the computer 120 collects data related to target objects 90 within the data collection range of the first vehicle 20, as described with reference to the block 530. Upon collecting data related to the target objects 90 within the data collection range, the process continues in a block 735.

In the block 735, the computer 120 determines whether at least one target object 90 is within the target range.

As one example, the target range may be defined as the planned travel path 208 plus an area extending the object-path distance threshold from the plan travel path 208 on either side.

In another example, the target range may be defined to include the planned travel path 208, the area extending the object path distance threshold from the planned travel path 208 on either side, and in addition to include the first range 602 surrounding the intersection 601, as discussed in reference to FIG. 6.

In another example, the target range may be defined as within an object-signal distance threshold of the traffic sign 640. The object-signal distance threshold, in the context of a detected traffic sign is a maximum distance between the target object 90 and the traffic sign 640 for which the computer 120 is programmed to instruct the image projector 126 to project the symbol 164.

In one case, the object-signal distance threshold may be a predetermined distance such as 10 meters. In another case, the object signal distance threshold may depend on one or more factors such as the type of object (pedestrian, cyclist, second vehicle, etc.), the type of sign (stop, yield, etc.), location of the sign (geo-coordinates indicating at which intersection the sign is located), etc. The computer 120 or server 60 may maintain a table of object-signal distance thresholds. The computer 120 may determine that the target object 90 is within the target range in the case that the target object 90 is within the object-signal distance threshold of the traffic sign 640.

In the case that the computer 120 determines that the target object 90 is within the target range, the process continues in a block 740. Otherwise, the process 700 continues in the block 725.

In the block 740, the computer 120 determines whether a trigger event for projecting the symbol 164 is present. Example trigger events may include that the first vehicle 20 is stopped at the traffic signal 40, that the first vehicle 20 is entering the intersection 601, is stopped in the intersection 601 waiting for an opportunity to turn left, is within a vehicle-object distance threshold, etc. The vehicle-object distance threshold may be, for example, a distance such as 50 meters. In the case that the computer 120 determines that the trigger for projecting the symbol 164 is present, the process 700 continues in a block 750. In the case that the computer 120 does not determine the presence of the trigger event, the process 700 continues in the block 725.

In the block 750 the computer 120 instructs the image projector 126 to project a first version of the trajectory symbol 164. For example, the computer 120 may instruct the image projector 126 to project the first version of the trajectory symbol 164 indicating the planned travel path 208 of the first vehicle 20. For example, in the case that the first vehicle 20 is stopped, the computer 120 may instruct the image projector 126 to project the first version of the trajectory symbol 164 in a first color, for example, red. The first version of the trajectory symbol 164 may be an outlined arrow as shown in FIG. 6, two or more lines indicating the planned travel path 208, a set of dots or dashed lines along the planned travel path 208, etc. Upon projecting the trajectory symbol 164, the process 700 continues in a block 755.

In the block 755, the computer 120 determines whether there is an upcoming change in trajectory for the first vehicle 20. A change in trajectory may be accelerating, decelerating, or changing direction. For example, the first vehicle 20 may be stopped at the stop sign 640 and planning to continue along the planned travel path 208. As another example, the first vehicle 20 may be stopped in the intersection 601, waiting for an opportunity to turn left. As another example, the first vehicle 20 may be going straight into the intersection 601 but planning to turn left once in the intersection. In the case that the computer 120 determines that there is a planned change in trajectory, the process 700 continues in a block 765. In the case that there is no planned change in trajectory, the process 700 continues in a block 760.

In the block 760, the computer 120 determines if the first vehicle has passed the target object 90. The computer 120 may determine, for example, the that the vehicle-object distance, indicating the distance of the first vehicle 20 to the target object 90, is no longer less than a vehicle-object distance threshold. As another example, the computer 120 may determine that the target object 90 is behind the first vehicle 20, and that the trajectory of the first vehicle 20 is away from the target object 90. In the case that the computer 120 determines that the first vehicle 20 is past the target object 90, the process 700 continues in a block 725. Otherwise, the process 700 continues in the block 750.

In the block 765, which follows the block 755, the computer 120 determines whether the time until the change in trajectory is less than a time threshold. The time threshold may be a predetermined time, such as two seconds. The time threshold represents the period of time that an indication of the change of trajectory is provided to the target object 90 before the change of trajectory occurs.

In the case that the time until the change in trajectory is less than the time threshold, the process 700 continues in a block 770. Otherwise, the process 700 continues in the block 750.

In the block 770, the computer 120 instructs the image projector 126 to project a second version of the trajectory symbol 164 to indicate the planned change in trajectory. For example, in the case that the first version of the trajectory symbol 164 was the first color, the computer 120 may instruct the image projector 126 to project the second version trajectory symbol 164 to be a second color. The second color may be, for example, yellow or green. As another example, the computer 120 may cause the second version of the trajectory symbol 164 to blink. The blinking may be at, for example, a two Hertz rate. Upon projecting the second version of the trajectory symbol 164, the process continues in the block 775.

In the block 775, the computer 120 determines whether the first vehicle 20 is past the target object 90 as described above in reference to the block 760. In the case that the first vehicle 20 is past the target object 90, the process 700 continues in the block 780. Otherwise, the process 700 continues in the block 770.

In the block 780, the computer 120 turns off the trajectory symbol 164. The process continues in the block 725.

Figure 8:
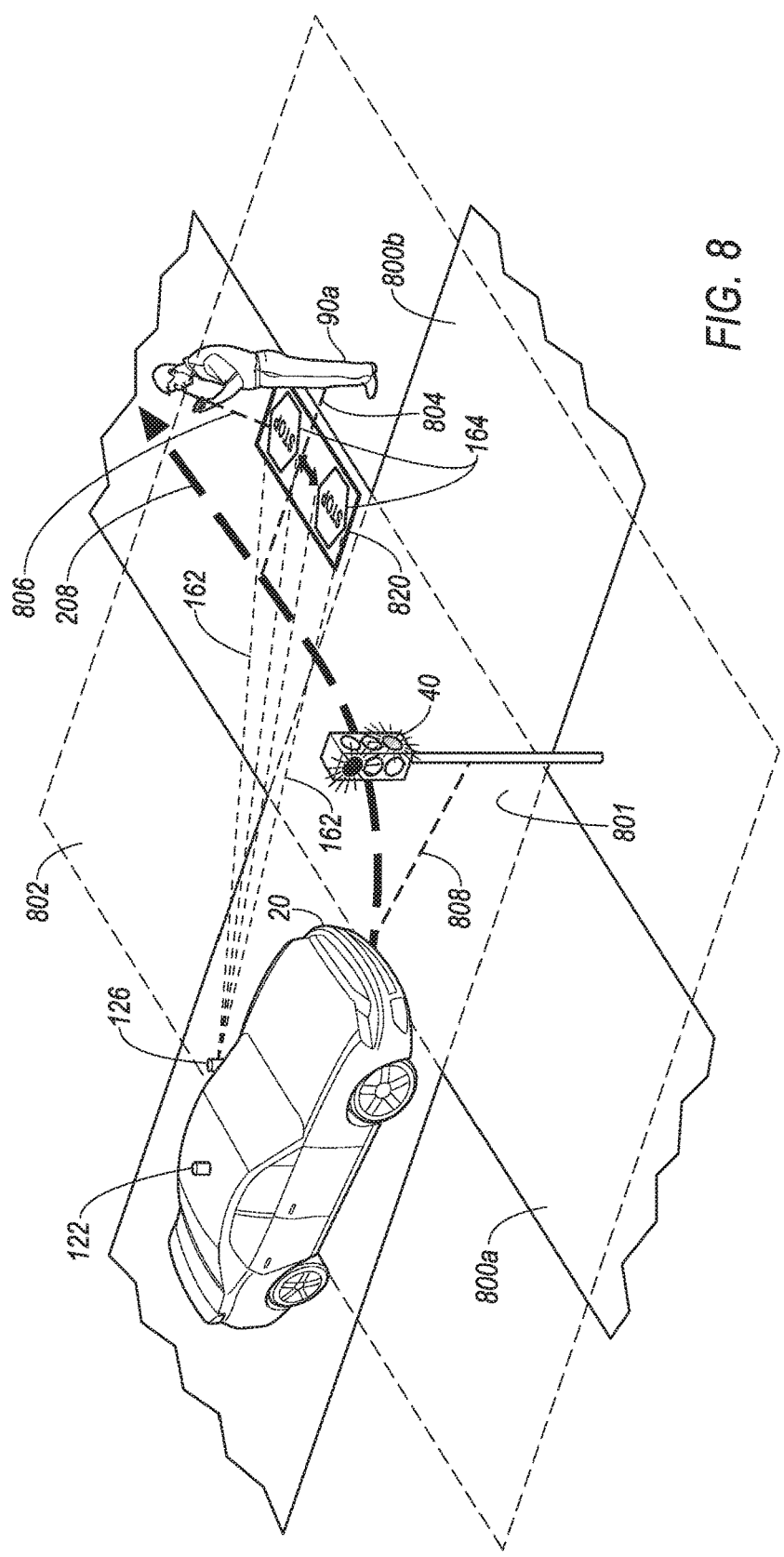
FIG. 8 is a diagram of an example vehicle projecting the symbol moving within a target area.

FIG. 8 is a diagram illustrating an example traffic condition in which the image projector 126 in the first vehicle 20 is projecting the symbol 164 moving through a target area 820. The first vehicle 20 is entering an intersection 801 and is travelling along the planned travel path 208. The traffic signal 40 is associated with the intersection 801. The first vehicle 20 is a vehicle-signal distance 808 from the traffic signal 40.

The planned travel path 208 is to continue through the intersection 801 and turn left. The intersection 801 is an area where first and second roads 800a, 800b cross. A pedestrian 90a is standing at a corner of the intersection 801, and looking at the pedestrian's mobile telephone. A line-of-sight 806 of the pedestrian 90a extends from the face of the pedestrian 90a toward the pedestrian's mobile telephone and further to the first road 800a. The pedestrian 90a is a representative example of the target object 90 that may be included in the example traffic condition.

The planned travel path 208 passes by the target object 90 within a distance less than the object-path distance threshold. A shortest straight line path 804 extends between the target object 90 and the planned travel path 208. The shortest straight line path 804 indicates the shortest path between the target object 90 and the travel path 208.

A first range 802 of the intersection 801 may be used to determine or identify whether the traffic signal 40 or other objects (including target objects 90) are associated with, or proximate to the intersection 801. The first range 802 may be defined as a range extending beyond the intersection 801 a first fixed distance, e.g., three meters, in every direction from the intersection 801. Additionally, or alternatively, the first range 802 may be predetermined, and included in map data indicating that the traffic signal 40 is associated with the intersection 801 and the first range 802 surrounding the intersection 801. For example, the first range 802 may be an irregular shape surrounding the intersection 801, designed by a developer of the map data, to include traffic signals 40, traffic signs, etc. associated with the intersection 801.

The computer 120 projects, via the image projector 126, the symbol 164 moving back and forth along the target area 820. As described in additional detail below, the computer 120 determines the target area 820 to increase the likelihood that the target object 90 will see the symbol 164.

Figure 9A:
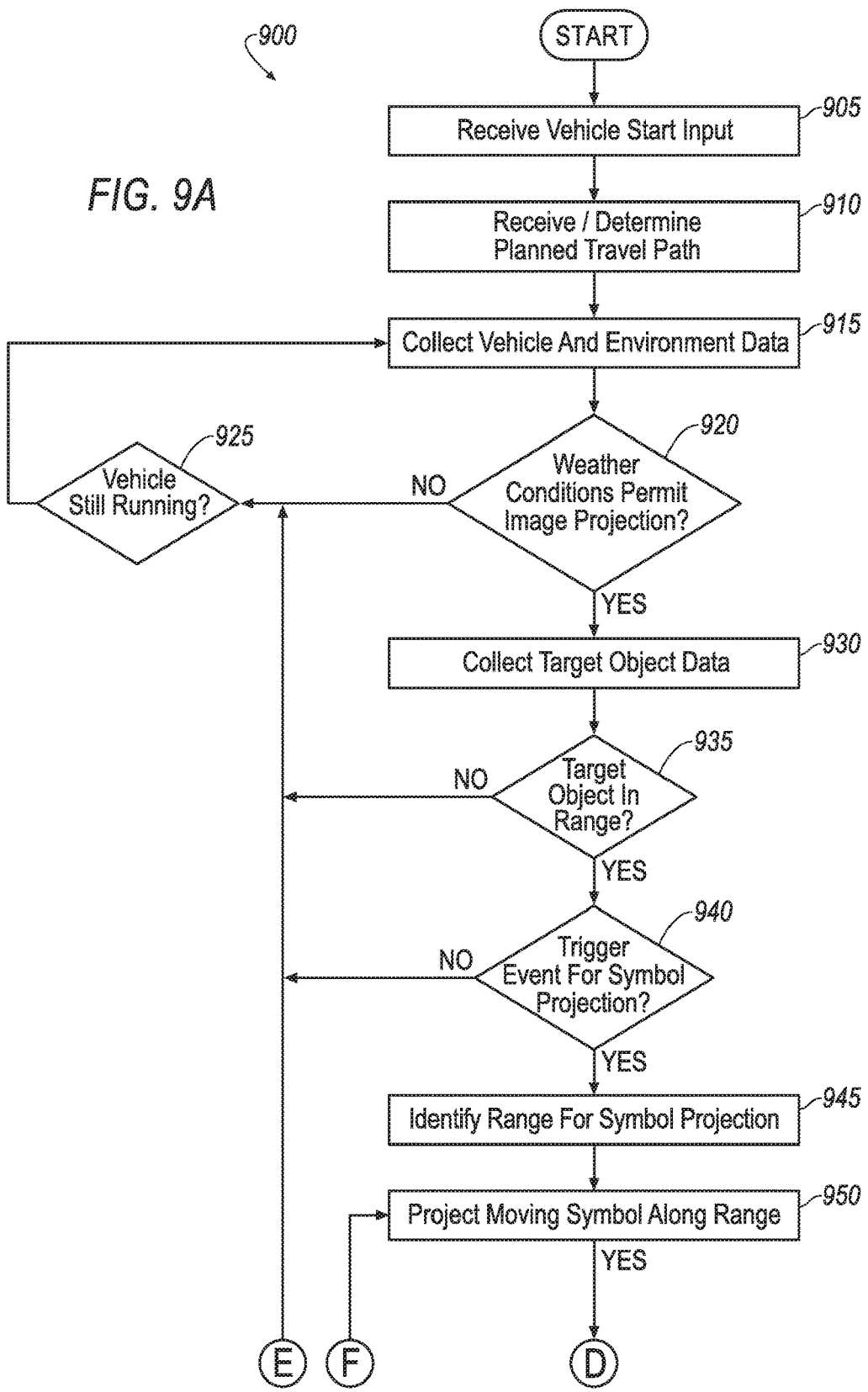
FIG. 9A is a diagram of a first portion of an exemplary process for projecting the symbol moving within the target area.
Figure 9B:
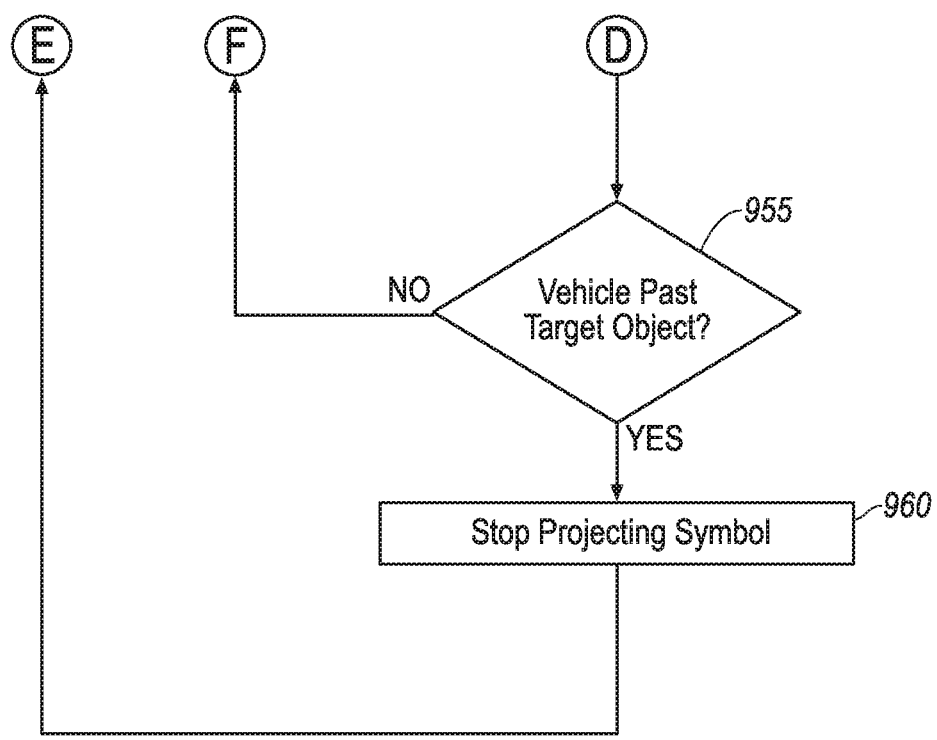
FIG. 9B is a diagram of the second portion of the exemplary process of FIG. 9A.

FIGS. 9A and 9B are a diagram of an exemplary process 900 for projecting the symbol 164 moving along the target area 820. The process 900 begins in a block 905.

In the block 905, the computer 120 in the first vehicle 20 receives an input indicating that the first vehicle 20 is being started as described above in reference to the block 505. Upon receiving the input indicating that the first vehicle 20 is being started, the process 900 continues in a block 910.

In the block 910, the computer 120 determines or receives the planned travel path 208 for the first vehicle 20 as described above in reference to the block 510. Upon determining or receiving the planned travel path 208, the process 900 continues in a block 915.

In the block 915, the computer 120 collects location data and environment data related to the first vehicle 20 as described in reference to the 515. Upon collecting the location environment data related to the first vehicle 20, the process 900 continues in the block 920.

In the block 920, the computer 120 may determine whether weather conditions permit projecting symbols by the first vehicle 20 as described in reference to block 520. In the case that the weather conditions do not permit projecting symbols by the first vehicle 20, the process 900 continues in a block 925. In the case that weather conditions do permit projecting symbols by the first vehicle 20, the process 900 continues in a block 930.

In the block 925, the computer 120 determines whether the first vehicle 20 is still running. For example, the computer 120 may collect data indicating that an ignition of the first vehicle 20 is still turned on, that an engine of the first vehicle 20 is still running, and/or an electric motor in a powertrain is engaged, etc. In the case that the first vehicle 20 is still running, the process 900 continues in the block 915. In the case that the first vehicle 20 is no longer running, the process 900 ends.

In the block 930, which follows the block 920, the computer 120 collects data related to target objects 90 within the data collection range of the first vehicle 20, as described with reference to the block 535. Upon collecting data related to the target objects 90 with the data collection range, the process continues in a block 935.

In the block 935, the computer 120 determines whether at least one target object 90 is within the target range.

The target range may be defined as the planned travel path 208 of the first vehicle 20 plus an area surrounding the plan travel path 208. As one example, the target range may be defined as the planned travel path 208 plus an area extending the object-path distance threshold from the plan travel path 208 on either side.

In another example, the target range may be defined to include the planned travel path 208, the area extending the object path distance threshold from the planned travel path 208 on either side, and in addition include the first range 802 surrounding the intersection 801, as discussed in reference to FIG. 8.

In another example, the target range may be defined as within an object-signal distance threshold of the traffic signal 40. The object-signal distance threshold may be, for example, a distance such as 10 meters. The computer 120 may determine that the target object 90 is within the target range in the case that the target object 90 is within the object-signal distance threshold of the traffic signal 40.

In the case that the computer 120 determines that the target object 90 is within the target range, the process continues in a block 940. Otherwise, the process 900 continues in the block 925.

In the block 940, the computer 120 determines whether a trigger event for projecting the symbol 164 is present. Example trigger events may include that the first vehicle 20 is stopped at the traffic signal 40, that the first vehicle 20 is entering the intersection 801, is stopped in the intersection 801 waiting for an opportunity to turn left, is within the vehicle-object distance threshold, etc. The vehicle-object distance threshold may be, for example, a fixed distance such as 50 meters. In the case that the computer 120 determines that the trigger for projecting the symbol 164 is present, the process 900 continues in a block 945. In the case that the computer 120 does not determine the presence of the trigger event, the process 900 continues in the block 925.

In the block 945, the computer 120 determines the target area 820 for projecting the symbol 164 based on the location of the target object 90. The target area 820 is the range along which the computer 120 will instruct the image projector 126 to project the symbol 164 and is determined to increase the likelihood that the target object 90 will see the symbol 164. As described below, the computer 120 will instruct the image projector 126 to move the symbol 164 through the target area 820. As one example, the computer 120 may determine the target area 820 to be a rectangular area, and may move the symbol 164 back and forth within the rectangular area, as indicated in FIG. 8.

The computer 120 may determine the target area 820 based on one or more parameters such as the location of the target object 90, the object-symbol range, the line-of-sight 806 of the target object 90, the shortest straight line path 804 between the target object 90 and the travel path 208, a direction of the first road 800a where it crosses the shortest straight line path 804, etc.

For example, initially, the computer 120 may locate the target area 820 be within the object-symbol range of the target object 90. The computer 120 may locate the target area 820 such that the shortest straight line path 804 passes through a middle of the target area 820. The computer 120 may further determine the target area 820 to extend an extension range beyond the shortest straight line path 804 on either side. The extension range may be a predetermined distance such as 0.5 meters. Alternatively, the extension range may be determined based on factors such as the type of target object 90. For example, the extension range could be 0.5 meters when the target object 90 is a pedestrian or a cyclist, and one meter when the target object is a second vehicle. The computer 120 may further determine the target area 820 to run perpendicular to the shortest straight line path 804.

Alternatively, the computer 120 may determine the target area such that the line-of-sight 806 of the target object 90 passes through the target area 820. The computer 120 may determine the target area 820 to extend the extension range on either side of the line-of-sight of the target object 90. In FIG. 8, the line-of-sight 806 is shown to be the line-of-sight 806 of the pedestrian 90a. The line-of-sight for determining the target area 820 may depend on the type of target object 90. For example, for a second vehicle 90b (see, for example, FIG. 6), the line-of-sight may be a line through a front windshield of the second vehicle 90b, towards a road in front of the second vehicle 90b.

As another example, alternatively to determining the target area 820 to run perpendicular to the shortest straight line path 804, the computer 120 may determine the target area 820 to run parallel to the travel path 208, or parallel to the first road 800a associated with the travel path 208.

The above examples are non-limiting. Many other possibilities for determining the target area 820 are possible. For example, the computer 120 may determine the target area 820 to be an arc that passes around the target object 90, between the target object 90 and the first road 800a. As another example, the target area 820 may be determined to be circular, i.e., the symbol 164 may be projected along a circular path, or to be projected in an X pattern, around an oval, etc. Still further, the target area 820 may be determined to cross a crosswalk at a particular location.

Upon determining the target area 820, the process 900 continues in a block 950.

In the block 950 the computer 120 instructs the image projector 126 to project the symbol 164 to move within or along the target area 820. For example, the computer 120 may instruct the image projector 126 to project the symbol 164 to move back and forth within the target area 820. As another example, the computer 120 may instruct the image projector 126 to project the symbol 164 to move in a circular or oval pattern within or along the target area 820. The computer 120 may instruct the image projector 126 to project the symbol 164 to move at a predetermined speed that is determined to get the attention of the target object 90. For example, the predetermined speed may be in a range from 0.1 to two meters per second.

Additionally, the computer 120 may be programmed to cause the symbol 164 to blink. The blinking frequency may be determined to get the attention of the target object 90, and may be in a range of five to eight Hertz.

Upon projecting the symbol 164 to move within the target area 820, the process 900 continues in a block 955.

In the block 955, the computer 120 determines whether the first vehicle 20 is past the target object 90 as described above in reference to the block 760. In the case that the first vehicle 20 is past the target object 90, the process 900 continues in the block 960. Otherwise, the process 900 continues in the block 950.

In the block 960, the computer 120 instructs the image projector 126 to stop projecting the symbol 164. The process continues in the block 925.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A computer, comprising a processor and a memory including instructions executable by the processor to:
   identify, based on received data, a target object within a predetermined distance of a planned path for a vehicle;
   determine a target symbol ground location based on the planned path and a maximum distance from the target object for projecting the symbol; and
   project, by a light source in the vehicle, a symbol to the target symbol ground location.

2. The computer of claim 1, the memory further including instructions to:
   project the symbol based on a determination that the vehicle is within a first maximum distance from a traffic signal.

3. The computer of claim 2, wherein the first maximum distance is a predetermined distance.

4. The computer of claim 2, the memory further including instructions to determine the first maximum distance based on identifying the traffic signal.

5. The computer of claim 2, the memory further including instructions to:
   receive data indicating a state of the traffic signal; and
   include a color of light in the symbol based on the state of traffic signal.

6. The computer of claim 5, the instructions further comprising, to:
   receive the data indicating the state of the traffic signal via radio frequency communications.

7. The computer of claim 5, the instructions further comprising, to:
   receive visual data representing the traffic signal via a sensor; and
   determine the state of the traffic signal based on the visual data.

8. The computer of claim 2, the instructions further comprising, to:
   project the symbol further based on a determination that the vehicle is stopped within a second maximum distance from the traffic signal.

9. The computer of claim 1, wherein the target object is one of a pedestrian, a cyclist and a second vehicle.

10. The computer of claim 1, the memory further including instructions to determine the maximum distance from the target object based on a type of target object.

11. The computer of claim 1, the memory further including instructions to:
    project the symbol to move within the target symbol ground location.

12. A computer, comprising a processor and a memory including instructions executable by the processor to:
    identify, based on received data, a target object within a predetermined distance of a planned path for a vehicle;
    determine a line-of-sight of the target object;
    determine a target symbol ground location based on the line-of-sight, and the planned path; and
    project, by a light source in the vehicle, a symbol to the target symbol ground location.

13. The computer of claim 12, wherein the instructions further include instructions to:
    project the symbol based on a determination that the vehicle is within a first maximum distance from a traffic signal.

14. A computer, comprising a processor and a memory including instructions executable by the processor to:
    identify, based on received data, a target object within a predetermined distance of a planned path for a vehicle;
    determine a shortest straight line path between the target object and the planned path for the vehicle;
    determine a target symbol ground location based on the shortest straight line path; and
    project, by a light source in the vehicle, a symbol to the target symbol ground location.

15. The computer of claim 14, wherein the instructions further include instructions to:
    project the symbol based on a determination that the vehicle is within a first maximum distance from a traffic signal.

16. A method comprising:
    identifying, based on received data, a target object within a predetermined distance of a planned path for a vehicle;
    determining a target symbol ground location based on the planned path and a maximum distance from the target object for projecting the symbol; and
    projecting, by a light source in the vehicle, a symbol to the target symbol ground location.

17. The method of claim 16, further comprising:
    projecting the symbol based on a determination that the vehicle is within a maximum distance from a traffic signal.

18. The method of claim 16, further comprising:
    determining a line-of-sight of the target object; and
    determining the target symbol ground location based on the line-of-sight.

19. The method of claim 16, further comprising:
    determining a shortest straight line path between the target object and the planned path for the vehicle; and
    determining the target symbol ground location based on the shortest straight line path.

20. The method of claim 16, further comprising:
    projecting the symbol to move within the target symbol ground location.

* * * * *